United States Patent
Peng et al.

(10) Patent No.: US 10,735,939 B2
(45) Date of Patent: Aug. 4, 2020

(54) MOBILITY MANAGEMENT METHOD AND APPARATUS

(71) Applicant: HUAWEI TECHNOLOGIES CO., LTD., Shenzhen, Guangdong (CN)

(72) Inventors: Wenjie Peng, Shanghai (CN); Hongzhuo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/185,289

(22) Filed: Nov. 9, 2018

(65) Prior Publication Data

US 2019/0082316 A1  Mar. 14, 2019

Related U.S. Application Data

(63) Continuation of application No. PCT/CN2016/081567, filed on May 10, 2016.

(51) Int. Cl.
*H04W 8/02* (2009.01)
*H04W 8/08* (2009.01)
(Continued)

(52) U.S. Cl.
CPC .............. *H04W 8/02* (2013.01); *H04W 8/08* (2013.01); *H04W 24/02* (2013.01); *H04W 48/20* (2013.01);
(Continued)

(58) Field of Classification Search
CPC ....... H04W 8/02; H04W 68/00; H04W 24/02; H04W 76/30; H04W 48/20; H04W 60/00;
(Continued)

(56) References Cited

U.S. PATENT DOCUMENTS

2004/0053606 A1*  3/2004  Artamo ................ H04W 16/14
                                                                455/422.1
2010/0242103 A1*  9/2010  Richardson ....... H04W 36/0061
                                                                726/7
(Continued)

FOREIGN PATENT DOCUMENTS

CN          101188862 A     5/2008
CN          101415176 A     4/2009
(Continued)

OTHER PUBLICATIONS

R3-160782 CATT,"Discussion on RAN-CN Functional Split in 5G NR",3GPP TSG RAN3 #91bis,Bangalore,India,Apr. 11-15, 2016,total 6 pages.
(Continued)

*Primary Examiner* — Brandon J Miller
(74) *Attorney, Agent, or Firm* — Fish & Richardson P.C.

(57) ABSTRACT

This application provide example mobility management methods, access network control devices, and communications systems. One example method includes receiving, by an access network control device, a location area request message of user equipment (UE) through a first station, where the UE is located in a cell managed by the first station. The access network control device can configure at least one location area identity list for the UE based on the location area request message, where the location area identity list includes at least one location area identity, and the location area identity is used to identify a location area. The access network control device can then send the at least one location area identity list to the UE through the first station.

18 Claims, 8 Drawing Sheets

(51) Int. Cl.
*H04W 48/20* (2009.01)
*H04W 60/00* (2009.01)
*H04W 76/30* (2018.01)
*H04W 24/02* (2009.01)
*H04W 68/00* (2009.01)
*H04W 88/12* (2009.01)
*H04W 88/06* (2009.01)

(52) U.S. Cl.
CPC ........... *H04W 60/00* (2013.01); *H04W 68/00* (2013.01); *H04W 76/30* (2018.02); *H04W 88/06* (2013.01); *H04W 88/12* (2013.01)

(58) Field of Classification Search
CPC ....... H04W 8/08; H04W 88/12; H04W 88/06; H04W 68/12
See application file for complete search history.

(56) References Cited

U.S. PATENT DOCUMENTS

| | | | |
|---|---|---|---|
| 2010/0255846 A1 | 10/2010 | Vikberg et al. | |
| 2010/0279697 A1* | 11/2010 | Yang | H04W 24/08 455/446 |
| 2010/0316034 A1* | 12/2010 | Burbidge | H04W 36/0022 370/338 |
| 2010/0323663 A1* | 12/2010 | Vikberg | H04J 11/0093 455/410 |
| 2011/0158165 A1 | 6/2011 | Dwyer et al. | |
| 2013/0034060 A1* | 2/2013 | Lu | H04W 4/90 370/328 |
| 2013/0176985 A1* | 7/2013 | Onishi | H04W 60/00 370/329 |
| 2014/0099969 A1* | 4/2014 | Hwang | H04W 48/20 455/453 |
| 2014/0148160 A1 | 5/2014 | Onishi et al. | |
| 2015/0045025 A1* | 2/2015 | Lim | H04W 36/20 455/434 |
| 2015/0215895 A1 | 7/2015 | Iwai et al. | |
| 2016/0080979 A1 | 3/2016 | Jin et al. | |
| 2016/0088462 A1* | 3/2016 | Jin | H04W 60/04 455/456.5 |
| 2016/0174271 A1* | 6/2016 | Jeong | H04W 68/12 455/445 |
| 2017/0078926 A1* | 3/2017 | Zhu | H04W 36/0022 |
| 2017/0311245 A1* | 10/2017 | Kuge | H04W 48/18 |
| 2018/0368094 A1* | 12/2018 | Deaconu | H04W 60/04 |

FOREIGN PATENT DOCUMENTS

| | | |
|---|---|---|
| CN | 102523573 A | 6/2012 |
| CN | 103125129 A | 5/2013 |
| EP | 2993930 A1 | 3/2016 |
| WO | 2014013660 A1 | 1/2014 |
| WO | 2014186968 A1 | 11/2014 |
| WO | 2014186969 A1 | 11/2014 |

OTHER PUBLICATIONS

S2-161507 Huawei, Hisilicon,"Solution for minimizing the MM signalling in early new RAT deploying phase",SA WG2 Meeting #114,Apr. 11-15, 2016, Sophia Antipolis, France,total 3 pages.

R3-060272 Siemens,"On Inter-RAT mobility for UEs in inactive modes",3GPP TSG RAN WG3 Meeting #51,Denver, Colorado, U.S., Feb. 13-17, 2006,total 9 pages.

Extended European Search Report and Written Opinion issued in International Application No. 16901241.6 dated Dec. 17, 2018, 12 pages.

International Search Report and Written Opinion issued in International Application No. PCT/CN2016/081567 dated Feb. 7, 2017, 17 pages.

Office Action issued in Japanese Application No. 2018-559384 dated Sep. 17, 2019, 11 pages (with English translation).

Office Action issued in Chinese Application No. 201680085449.X dated Dec. 4, 2019, 7 pages.

\* cited by examiner

MOBILITY MANAGEMENT METHOD AND APPARATUS

CROSS-REFERENCE TO RELATED APPLICATIONS

This application is a continuation of International Application No. PCT/CN2016/081567, filed on May 10, 2016, the disclosure of which is hereby incorporated by reference in its entirety.

TECHNICAL FIELD

Embodiments of the present application relate to the field of wireless communications, and in particular, to mobility management.

BACKGROUND

With development of wireless technologies, study of a next generation wireless communications system is increasingly intensive. Compared with an existing Long Term Evolution (LTE) technology, for the next generation wireless communications system, a new radio access technology (New RAT or NR) can provide shorter latency and a higher bandwidth, and support a large quantity of connections, to satisfy an increasing requirement of mobile communications.

A requirement of the next generation wireless communications system includes air interface transmission supporting a plurality of standards. Based on this requirement, a new network architecture is provided. The network architecture includes a core network supporting the NR. The core network includes at least one radio access network (RAN) server. The access network control device may include stations using a plurality of different radio access technologies (RAT), to respectively provide different RAT air interfaces. In the network architecture, regardless that user equipment (UE) is in a coverage area of a station using an RAT, information exchange between the UE and the core network is implemented by using an interface between a corresponding access network control device and the core network. When a relatively large quantity of UEs in an idle state reselect a cell or move in the access network control device, a large amount of signaling interaction exists between the access network control device and the core network. Consequently, excessive signaling results in overload of the interface, and a signaling response speed becomes slow, affecting system performance.

SUMMARY

Embodiments of the present application provide a mobility management method, to reduce interface signaling load of a core network side. The embodiments of the present application further provide an access network control device and a communications system.

According to a first aspect, a mobility management method is provided. The method includes: receiving, by an access network control device, a location area request message of UE through a first station, where the UE is located in a cell managed by the first station; configuring, by the access network control device, at least one location area identity list for the UE based on the location area request message, where the location area identity list includes at least one location area identity, and the location area identity is used to identify a location area; and sending, by the access network control device, the at least one location area identity list to the UE through the first station.

With reference to the first aspect, in a first implementation of the first aspect, the location area includes at least two cells, and the at least two cells use different RATs. For example, one cell uses an LTE access technology, and the other cell uses a UMTS access technology.

With reference to the first aspect, in a second implementation of the first aspect, the configuring, by the access network control device, at least one location area identity list for the UE based on the location area request message includes: configuring, by the access network control device, a first location area identity list and a second location area identity list for the UE based on the location area request message, where all cells included in a location area identified by any location area identity in the first location area identity list use a first RAT, all cells included in a location area identified by any location area identity in the second location area identity list use a second RAT, and the first RAT is different from the second RAT. For example, location area identity lists A and B are configured for the UE. All cells included in a location area identified by any location area identity in the location area identity list A use the LTE access technology, and all cells included in a location area identified by any location area identity in the location area identity list B use the UMTS access technology.

With reference to any one of the first aspect or the foregoing implementations of the first aspect, in a third implementation of the first aspect, the location area request message is an attach request message;

the configuring, by the access network control device, a location area identity list for the UE based on the location area request message includes: sending, by the radio access network device, a registration request message to a core network device based on the attach request message; and configuring, by the radio access network device, the at least one location area identity list for the UE after receiving a registration request response message sent by the core network device; and the sending, by the access network control device, the at least one location area identity list to the UE through the first station includes: sending, by the radio access network device through the first station, an attach request response message including the at least one location area identity list to the UE.

With reference to any one of the first aspect or the foregoing implementations of the first aspect, in a fourth implementation of the first aspect, the method further includes: receiving, by the access network control device, a location area update request message sent by the first station, where the location area update request message is used by the UE to request to update the location area; updating, by the access network control device, the location area identity list of the UE based on the location area update request message; and sending, by the radio access network device through the first station, a location area update request response message to the UE, where the location area update request response message includes an updated location area identity list.

With reference to the fourth implementation of the first aspect, in a fifth implementation of the first aspect, before the updating, by the access network control device, the location area identity list of the UE based on the location area update request message, the method further includes: sending, by the access network control device, an update indication to the core network device, where the update indication is used to instruct the core network device to update an access network control device associated with the UE to the access network control device.

With reference to the fifth implementation of the first aspect, in a sixth implementation of the first aspect, the update indication includes identification information of the UE.

With reference to any one of the first aspect or the foregoing implementations of the first aspect, in a seventh implementation of the first aspect, the method further includes: receiving, by the access network control device, a first paging message sent by the core network device, where the first paging message is used to instruct the access network server to perform paging on the UE; and sending, by the access network server, a second paging message to a station corresponding to the location area identity list configured for the UE, where the second paging message is used to instruct the station to perform paging on the UE.

According to a second aspect, an access network control device is provided. The access network control device includes: a first receiving unit, adapted to receive a location area request message of UE through a first station, where the UE is located in a cell managed by the first station; a processing unit, adapted to configure at least one location area identity list for the UE based on the location area request message, where the location area identity list includes at least one location area identity, and the location area identity is used to identify a location area; and a first sending unit, adapted to send the at least one location area identity list to the UE through the first station.

With reference to the second aspect, in a first implementation of the second aspect, the location area includes at least two cells, and the at least two cells use different RATs.

With reference to the second aspect, in a second implementation of the second aspect, the processing unit is specifically adapted to configure a first location area identity list and a second location area identity list for the UE based on the location area request message, where all cells included in a location area identified by any location area identity in the first location area identity list use a first RAT, all cells included in a location area identified by any location area identity in the second location area identity list use a second RAT, and the first RAT is different from the second RAT.

With reference any one of the second aspect or the foregoing implementations of the second aspect, in a third implementation of the second aspect, the location area request message received by the first receiving unit is an attach request message;

the device further includes a second sending unit, adapted to send a registration request message to a core network device based on the attach request message received by the first receiving unit;

the device further includes a second receiving unit, adapted to receive a registration request response message sent by the core network device;

the processing unit is specifically adapted to: after the second receiving unit receives the registration request response message sent by the core network device, configure the at least one location area identity list for the UE; and the first sending unit is specifically adapted to send, through the first station, an attach request response message including the at least one location area identity list to the UE.

With reference to any one of the second aspect or the foregoing implementations of the second aspect, in a fourth implementation of the second aspect, the first receiving unit is further adapted to receive a location area update request message sent by the first station, the location area update request message is used by the UE to request to update the location area; the processing unit is further adapted to update the location area identity list of the UE based on the location area update request message; and the first sending unit is specifically adapted to send, through the first station, a location area update request response message including an updated location area identity list to the UE.

With reference to the fourth implementation of the second aspect, in a fifth implementation of the second aspect, the access network control device further includes the second sending unit, adapted to: before the processing unit updates the location area identity list of the UE based on the location area update request message, send an update indication to the core network device, where the update indication is used to instruct the core network device to update an access network control device associated with the UE to the access network control device.

With reference to the fifth implementation of the second aspect, in a sixth implementation of the second aspect, the update indication includes identification information of the UE.

With reference to any one of the second aspect or the foregoing implementations of the second aspect, in a seventh implementation of the second aspect, the device further includes: a second receiving unit, adapted to receive a first paging message sent by the core network device, where the first paging message is used to instruct the access network server to perform paging on the UE; and the first sending unit is further adapted to send a second paging message to a station corresponding to the location area identity list configured for the UE, where the second paging message is used to instruct the station to perform paging on the UE.

According to a third aspect, a mobility management method is provided. The method includes: receiving, by a core network device, an update indication sent by an access network control device, where the update indication includes identification information of UE, and the UE is located in a cell managed by the access network control device; and updating, by the core network device based on the identification information of the UE, an access network control device associated with the UE to the access network control device.

With reference to the third aspect, in a first implementation of the third aspect, the method further includes: maintaining, by the core network device, an identification mapping list, where the identification mapping list indicates a mapping relationship between the identification information of the UE and identification information of the access network control device; and the updating, by the core network device based on the identification information of the UE, an access network control device associated with the UE to the access network control device includes: updating, by the core network device based on the identification information of the UE, identification information of an access network control device that is mapped to the identification information of the UE and that is in the identification mapping list to the identification information of the access network control device.

With reference to the third aspect, in a second implementation of the third aspect, the method further includes: sending, by the core network device, a release request to a source access network control device, where the release request is used to instruct the source access network control device to release a context of the UE, and the source radio access network service is an access network control device associated with the UE before the updating.

According to a fourth aspect, a core network device is provided. The core network device includes: a receiving unit, adapted to receive an update indication sent by an access network control device, where the update indication includes identification information of UE, and the UE is located in a cell managed by the access network control device; and a processing unit, adapted to update, based on the identification information of the UE, an access network control device associated with the UE to the access network control device. The access network control device performs mobility management on the UE, and only when the UE crosses the access network control device and moves, notifies the core network device to update an association relationship, reducing signaling interaction between an access network side and a core network side and reducing interface signaling load, thereby increasing a signaling response speed and improving system performance.

With reference to the fourth aspect, in a first implementation of the fourth aspect, the processing unit is further adapted to maintain an identification mapping list, where the identification mapping list indicates a mapping relationship between the identification information of the UE and identification information of the access network control device; and that the processing unit is adapted to update, based on the identification information of the UE, an access network control device associated with the UE to the access network control device includes: updating, based on the identification information of the UE, identification information of an access network control device that is mapped to the identification information of the UE and that is in the identification mapping list to the identification information of the access network control device. The access network control device performs mobility management on the UE, and only when the UE crosses the access network control device and moves, notifies the core network device to update an association relationship, reducing signaling interaction between an access network side and a core network side and reducing interface signaling load, thereby increasing a signaling response speed and improving system performance.

With reference to the fourth aspect, in a second implementation of the fourth aspect, the device further includes a sending unit, where the sending unit is adapted to send a release request to a source access network control device, the release request is used to instruct the source access network control device to release a context of the UE, and the source radio access network service is an access network control device associated with the UE before the updating.

According to the method, the device, and the system disclosed in the embodiments of the present application, the access network control device performs mobility management on the UE, reducing signaling interaction between an access network side and a core network side and reducing interface signaling load, thereby increasing a signaling response speed and improving system performance.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Figure 1:
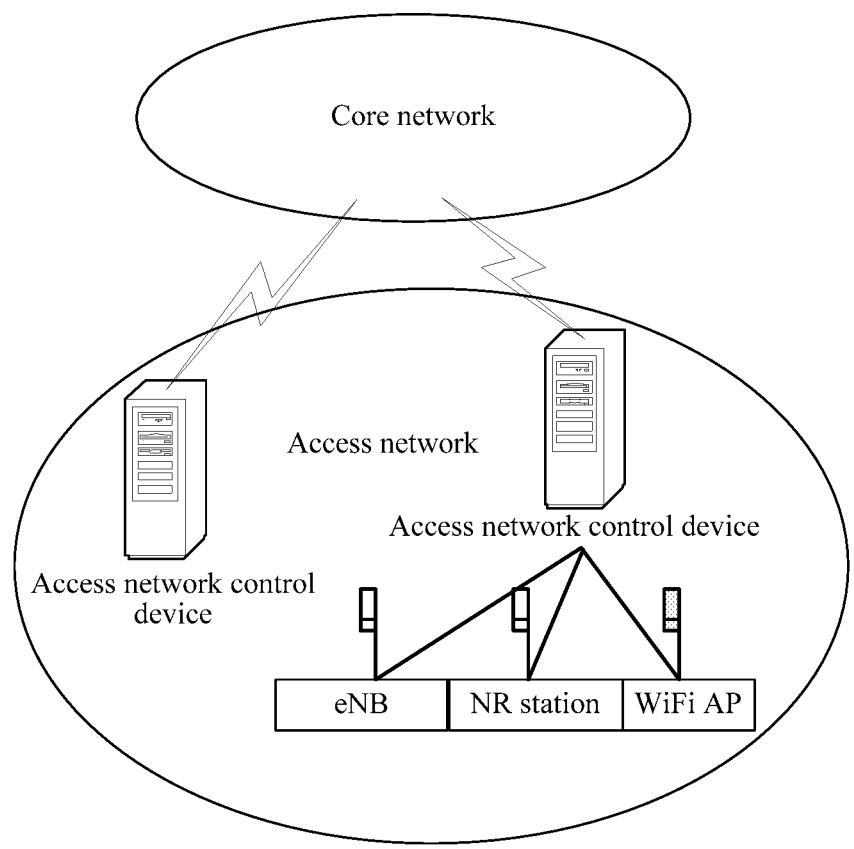
FIG. 1 is a schematic diagram of an application scenario according to an embodiment of the present application.

A technology described in this specification may be applied to various communication systems, for example, a 2G system such as a Global System for Mobile communications (GSM), a 3G system such as a Wideband Code Division Multiple Access Wireless (WCDMA) system, a 4G system such as a Long Term Evolution (LTE) system, an NR communications system which is an evolution of LTE, and a combined communications network of a wireless local area network (WLAN) and a cellular network. Particularly, a new radio access technology (new radio access technology, NR/NRAT) described in the embodiments of the present application may be considered as a communications technology, including a 5G communications system, that emerges after the 4G system.

A base station in the embodiments of the present application may be a base transceiver station (BTS) in GSM, a NodeB in WCDMA, or an evolved NodeB (eNB or e-NodeB) in LTE, a similar base station in the NR communications system, or the like.

In the embodiments of the present application, a concept of the communications system is the same as that of a communications network, and the communications system is used as an example for description in the embodiments of the present application.

UE in the embodiments of the present application may include a handheld device that has a wireless communication function, an in-vehicle device, a wearable device, a computing device, or another processing device connected to a wireless modem, and user equipment (UE), a mobile station (MS), a terminal, terminal equipment, and the like that are of various forms. For ease of description, in this application, the UE is referred to as "user equipment" or "UE".

In the embodiments of the present application, a one-way communications link from the base station to the UE is defined as a downlink, and a one-way communications link from the UE to the base station is an uplink.

A resource described in the embodiments of the present application is a transmission resource, including a time domain resource and a frequency domain resource, and may be used to bear data or signaling in an uplink communication process or a downlink communication process. That is, the resource in the embodiments of the present application may be an uplink resource allocated by the base station to the UE and is used for the UE to send uplink data; or may be a downlink resource allocated by the base station to the UE and is used for the UE to receive downlink data.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

The term "a plurality of" in the embodiments of the present application means two or more than two. The descriptions such as "first" and "second" in the embodiments of the present application are merely an example and are intended to distinguish between described objects but do not particularly indicate a specific sequencer and do not represent particular limitation on a quantity of devices in the embodiments of the present application either, and constitute no limitation to the embodiments of the present application.

FIG. 1 is a schematic diagram of an application scenario according to an embodiment of the present application. A communications network shown in FIG. 1 includes a core network (CN) and a radio access network (RAT), and the CN manages the RAN. The CN in this embodiment of the present application is a 5G CN, may manage a new access network including an NR access network and the like, a 2G, 3G or 4G access network, and different standards of RANs including WLAN, and has various core network functions such as service traffic statistics and charging and service delivery.

As shown in FIG. 1, the RAN includes an access network control device and a station. Specifically, various stations using different radio access technologies (RAT) may be deployed under the access network control device. That is, a standard of each station is different. The access network control device performs unified management on the various stations in a coverage area of the access network control device. In this embodiment of the present application, the access network control device may be a radio access network server ("RAN server" for short). The RAN server manages stations of various standards.

A communications interface exists between the CN and the access network control device, to implement communication between the CN and the RAN. Specifically, an optical fiber or a microwave may be used for connection. The access network control device may communicate with the stations in various wired or wireless manners. This is not limited in this embodiment of the present application.

The stations respectively provide different RAT air interfaces. For example, as shown in FIG. 1, an eNB, an NR station, and a WLAN access point (AP) may be connected to the access network control device, to separately provide an LTE air interface service, an NR air interface service, and a WLAN air interface service. Each station may manage one or more cells. For example, a cell managed by the eNB is referred to as an LTE cell, a cell managed by the NR station is referred to as an NR cell, and a cell managed by the WLAN AP is referred to as a WLAN cell. After UE enters a corresponding cell, an air interface service provided by a corresponding station can be obtained after the station is accessed.

With reference to an LTE protocol stack, the access network control device provided in this embodiment of the present application has upper-layer functions, that is, has functions of a Packet Data Convergence Protocol (PDCP) layer and higher layers. Correspondingly, the eNB, the NR station, and the WLAN AP managed by the access network control device may be respectively configured with a lower-layer protocol stack, and share an upper-layer protocol function of the access network control device. An optional solution is: A protocol stack of the access network control device includes a Radio Resource Control (RRC) layer, a PDCP layer, and an access adaption layer. The access adaption layer can be adapted to signaling interaction between each standard of station and the CN, so that the CN does not sense an access standard. Correspondingly, the protocol stacks of the eNB and the NR station include a Radio Link Control (RLC) layer, a Media Access Control (MAC) layer and a physical layer, and a protocol stack of the WLAN AP includes a MAC layer and a physical layer.

In another implementation of the present application, the access network control device may be a control unit (CU), the station may be a distributed unit (DU), and the CU and the DU jointly constitute the RAN. The CU may manage a plurality of different standards of DUs.

It may be understood that the CN may be connected to one or more access network control devices. A quantity of the access network control devices shown in FIG. 1 is merely an example, and does not limit a quantity of access network control devices in a communications network. During actual networking, any quantity of access network control devices may be set based on a network performance requirement.

Correspondingly, the UE in this embodiment of the present application supports multimode communication, that is, may communicate with any one of the stations in the foregoing communications network. For example, the UE can respectively camp on the eNB, the NR station, and the WLAN AP, and transmit data by using the air interface of each station.

In the network architecture of the access network control device, the UE may have at least two states: an idle state and a connected state. In the idle state, a context of the UE cannot be retained on the RAN side, that is, the access network control device and each standard of station, but the context of the UE can be retained in the CN. In the connected state, there is a connection between the UE and at least one standard of station, and the context of the UE is retained on both the RAN side and the CN.

In addition, the UE may have a deactivated state. The state is between the idle state and the connected state. When the UE is in the deactivated state, the context of the UE is retained on both the RAN side and the CN, but there is no air interface connection between the UE and the RAN.

The present application is applicable to the UE in the idle state and deactivated state. For example, in this embodiment, movement of UE in an idle state is used as an example for description.

Figure 2:
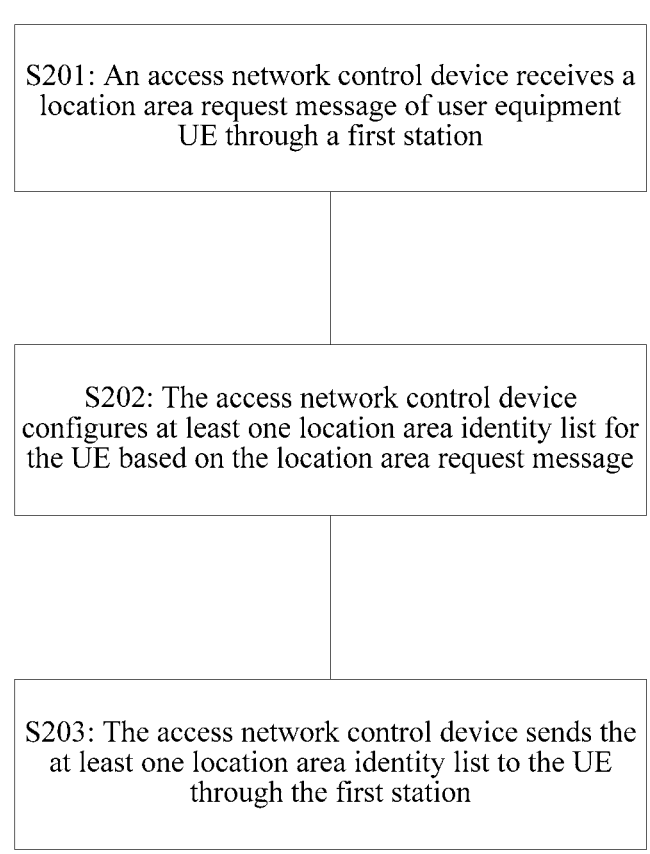
FIG. 2 is a schematic flowchart of a mobility management method according to an embodiment of the present application.

FIG. 2 is a schematic flowchart of a mobility management method according to an embodiment of the present application. The mobility management method includes steps S201 to S203.

S201: An access network control device receives a location area request message of user equipment UE through a first station, where the UE is located in a cell managed by the first station.

Specifically, the first station is a station managed by the access network control device. After entering a cell of the first station, the UE may access the first station and obtain a communication service. The first station may be a station of any standard. This is not limited in this embodiment of the present application.

S202: The access network control device configures at least one location area identity list for the UE based on the location area request message, where the location area identity list includes at least one location area identity, and the location area identity is used to identify a location area.

The access network control device may provide an upper-layer protocol service for the first station, for example, have functions of a PDCP layer and higher layers.

S203: The access network control device sends the at least one location area identity list to the UE through the first station.

The location area identity in this embodiment of the present application may be used to indicate a location area in which the UE in an idle state is located. The location area is similar to a concept of a tracking area (TA) in an LTE network, and may include one or more cells. The cells included in the location area may be managed by a same station, or may be managed by different stations. When the cells are managed by different stations, the different stations may be of a same standard or different standards. To be specific, the location area may include a same standard of cells, for example, include only LTE cells; or may include cells of different standards, for example, include various types of cells such an LTE cell and an NR cell.

Cells in a same location area are identified by using a same location area identity. A location area identity list may include one or more location area identities. The location area identity list may indicate one or more location areas, and the UE is located in one of the location areas.

Optionally, the location area identity includes a public land mobile network identity (PLMN ID) and a moving area code (MAC), or may be in another form. This is not limited in this embodiment of the present application.

Optionally, in an embodiment of the present application, the location area in step S202 includes at least two cells, and the two cells use different RATs.

The architecture of the access network control device shown in FIG. 1 is used as an example. Both the NR station and the WLAN AP use a TA division method of an LTE station. To be specific, the TA division does not distinguish between standards such as LTE, NR, or WLAN, and an LTE cell, an NR cell, or a WLAN cell that are in a same geographical area are all configured with a same TAI and constitute a TA. A range of the foregoing geographical area may be preset by a system. To be specific, the system predetermines one or more geographical areas, each geographical area includes one or more cells, and the one or more cells constitute a TA. It may be understood that in this embodiment, cells using different RATs use a unified location area division method. The foregoing TA division method is only an example, and does not constitute a limitation.

Optionally, in another embodiment of the present application, step S202 may specifically include:

configuring, by the access network control device, a first location area identity list and a second location area identity list for the UE based on the location area request message, where all cells included in a location area identified by any location area identity in the first location area identity list use a first RAT, all cells included in a location area identified by any location area identity in the second location area identity list use a second RAT, and the first RAT is different from the second RAT.

The architecture of the access network control device shown in FIG. 1 is still used as an example. The access network control device manages stations of various standards such as the eNB, the NR station, and the WLAN AP, and may separately divide cells in each standard of station into location areas. Specifically, a signal coverage area of the LTE station may be divided into one or more TAs, and each TA is identified by using a TAI. LTE cells in one TA are all configured with a same TAI, and the TAI is broadcast in each cell. A signal coverage area of the NR station is divided into one or more moving areas (MA), and each MA is identified by using an MAI. NR cells in one MA are all configured with a same MAI, and the MAI is broadcast by the NR station. A signal coverage area of the WLAN AP is divided into a plurality of serving areas (SA), and each SA is identified by using an SAI. WLAN cells in one SA are all configured with a same SAI, and the SAI is broadcast. It may be understood that in this embodiment, location area division is performed based on standards of cells, to constitute a plurality of location area identity lists corresponding to different standards.

According to the mobility management method in this embodiment of the present application, the access network control device managing stations of various standards configures the location area identity list for the UE based on the location area request message of the UE instead of reporting the location area request message to a core network to request the core network to configure a location area identity list for the UE. In this way, mobility management of the UE on an access network side is implemented, signaling interaction between the access network side and the core network side is reduced, and interface signaling load is reduced, thereby increasing a signaling response speed and improving system performance.

Figure 3:
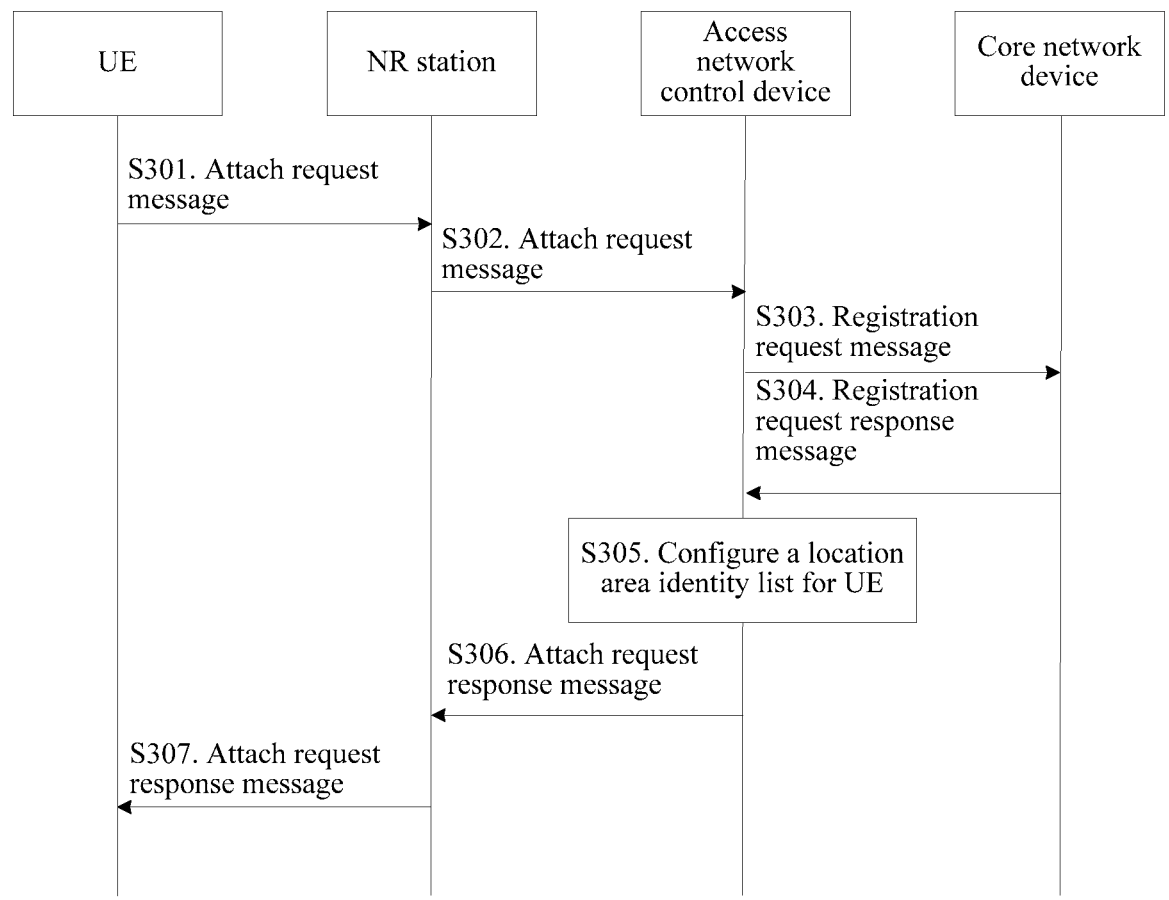
FIG. 3 is a schematic signaling flowchart of an attach method according to an embodiment of the present application.

FIG. 3 is a schematic signaling flowchart of an attach method according to an embodiment of the present application. The embodiment shown in FIG. 3 is a further description of the embodiment shown in FIG. 2.

Figure 4:
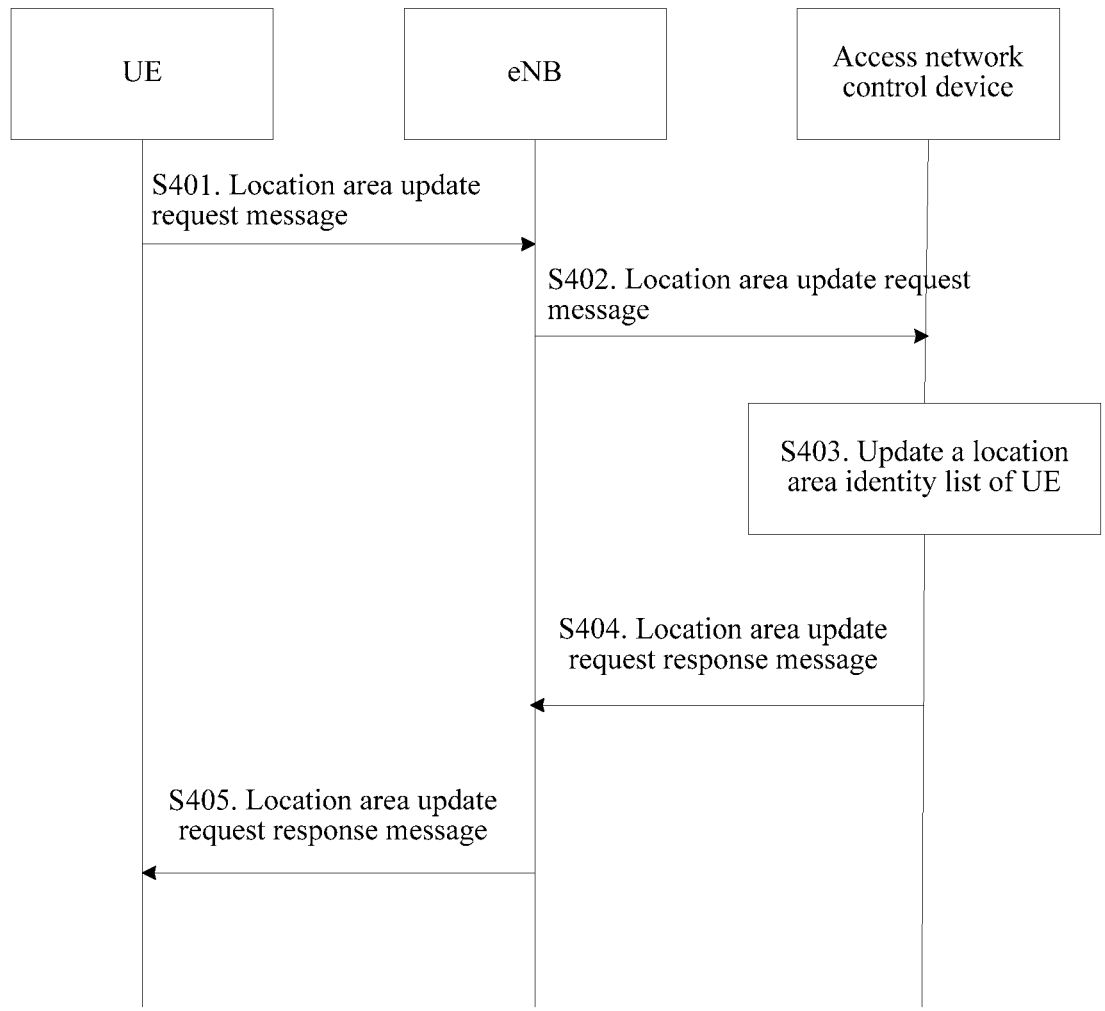
FIG. 4 is a schematic signaling flowchart of a location area update method according to an embodiment of the present application.
Figure 5:
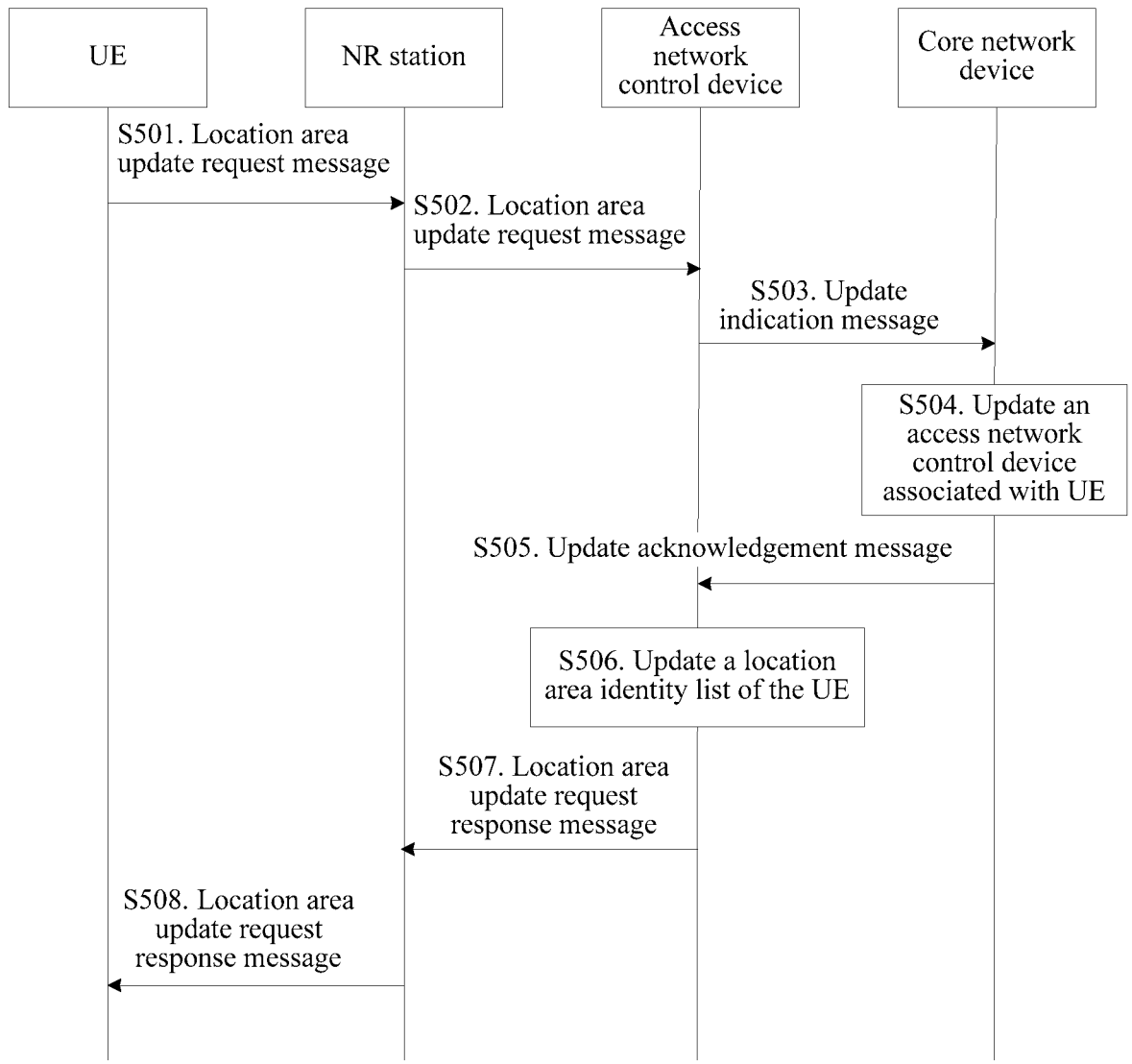
FIG. 5 is a schematic signaling flowchart of another location area update method according to an embodiment of the present application.

For clarity, in embodiments shown in FIG. 3 to FIG. 5, it is assumed that an access network control device manages three stations, namely, an eNB, an NR station, and a WLAN AP that use different RATs, and UE is located in a cell of the NR station and accesses a network through the NR station. It may be understood that, a type and a quantity of stations managed by the access network control device are not limited in these embodiments of the present application.

In addition, in the embodiments shown in FIG. 3 to FIG. 5, it is assumed that the cells using different RATs correspond to a same location area identity list. To be specific, the cells using different RATs use a unified location area division method.

The method includes steps S301 to S307.

S301: The UE sends an attach request message to the NR station.

Specifically, to obtain a network service, the UE first needs to complete registration on a network side. Therefore, the UE sends the attach request message to the NR station. The attach request message includes at least identification information of the UE and a location area identity of a cell in which the UE is located when the UE initiates the attach request.

The identification information of the UE may be specifically a temporary mobile subscriber identity (TMSI), an international mobile subscriber identity (IMSI), or other similar identification information. This is not limited in this embodiment of the present application.

S302: The NR station sends the attach request message to the access network control device.

After receiving the attach request message, the NR station forwards the message to the access network control device. In this forwarding process, the NR station only forwards the attach request message to the access network control device and does not parse a related information element in the attach request message.

S303: The access network control device sends a registration request message to a core network device.

After receiving the attach request message sent by the NR station, the access network control device parses the attach request message, and sends the registration request message to the core network device for the UE, to request the core network device to complete registration for the UE. In this way, the core network device can learn a range managed by an access network control device and in which the UE is located in.

It may be understood that, a specific type of the core network device is not particularly limited in this embodiment of the present application, and may be a single core network device similar to a mobility management entity (MME) device, or may be a combination of a plurality of core network devices.

S304: The core network device replies to the access network control device with a registration request response message.

After completing registration for the UE, the core network device replies to the access network control device with the registration request response message.

S305: The access network control device configures a location area identity list for the UE.

After receiving the registration request response message sent by the core network device, the access network control device configures the location area identity list for the UE. The access network control device may configure the location area identity list for the UE based on a reported location area identity of a cell in which the UE currently is located. For detailed descriptions of the location area identity list, refer to the related descriptions in the embodiment shown in FIG. 2, and details are not described herein again.

S306: The access network control device sends an attach request response message including the location area identity list to the NR station.

S307: The NR station sends the attach request response message to the UE.

After receiving the attach request response message sent by the access network control device, the NR station forwards the attach request response message to the UE.

In the attach process, the access network control device sends the registration request to the core network device to complete registration for the UE, and is responsible for configuring the location area identity list for the UE. The UE can obtain the location area identity list configured by the access network control device for the UE. In an LTE cell, an NR cell, and a WLAN cell that correspond to the location area identity list, when the UE in an idle state moves, there is no need to initiate an update.

Optionally, in another embodiment of the present application, after the UE completes the registration, if a downlink service of the UE needs to be sent, a network side may initiate a paging process. Correspondingly, the method further includes steps S308 to S3010.

S308: The core network device sends a paging message to the access network control device based on a mapping relationship between the UE and the access network control device. The paging message is used to instruct the access network control device to perform paging on target UE.

Specifically, the core network device may maintain an identification mapping list. The identification mapping list indicates a mapping relationship between the identification information of the UE and identification information of a radio access network server. The core network device may find, based on the identification information of the UE, an access network control device corresponding to the UE, thereby sending the paging message to the access network control device.

S309: The access network control device sends the paging message to a corresponding station.

After receiving the paging message sent by the core network device, the access network control device sends, based on the location area identity list configured for the UE, the paging message to a station corresponding to the location area identity list. The station may include stations of various standards. The paging message is used to instruct the station to perform, by using an air interface, paging on the UE.

S3010: Each station initiates paging for the UE by using an air interface.

After receiving the paging message sent by the access network control device, each station performs, based on the location area identity list, paging on the UE in a cell managed by the station. The cell uses the location area identity in the location area identity list.

According to the foregoing paging method, the access network control device determined by a core network searches for a corresponding station based on the location area identity list to perform paging. The core network device does not need to page each station, reducing signaling load on the core network side in the paging process.

Optionally, in another embodiment of the present application, the access network control device may configure a plurality of location area identity lists for the UE, and each list corresponds to a cell using an RAT. For example, the access network control device simultaneously configures a TAI list, an MAI list, and an SAI list for the UE. For details, refer to the related descriptions in the embodiment shown in FIG. 2. The access network control device simultaneously configures location area identities representing cells of different standards for the UE in the attach process and a subsequent location area update process.

Optionally, when sending a location area update request message, the UE may request the access network control device to update some or all of the location area identity lists. Alternatively, the access network control device may determine, based on current location information of the UE, to update some or all of the location area identity lists for the UE.

When the UE in an idle state moves in a range managed by the access network control device and goes beyond an original range of a cell corresponding to the configured location area identity list, the UE initiates a location area update process, and obtains a location area identity list corresponding to a cell on which the UE currently camps on.

FIG. 4 is a schematic signaling flowchart of a location area update method according to an embodiment of the present application. The location area update method includes steps S401 to S405.

This embodiment is described by using an example in which UE in an idle state enters an LTE cell that is out of a range of a cell corresponding to a location area identity list. The LTE cell is located in a coverage area of the access network control device, and the LTE is managed by the access network control device.

S401: The UE sends a location area update request message to an eNB.

The location area update request message is used by the UE to request to update the location area. When the UE in an idle state enters an LTE cell, and the UE detects that a location area identity of the LTE cell does not belong to a currently configured location area identity list of the UE, the UE initiates a location area update process, and first sends the location area update request message to the eNB managing the LTE cell. For specific content and a format of the location area update request message, refer to a tracking area update (TAU) request message used in an LTE system. Details are not described herein.

S402: The eNB sends the location area update request message to the access network control device.

After receiving the location area update request message sent by the UE, the eNB forwards the location area update request message to the access network control device.

S403: The access network control device updates the location area identity list of the UE.

After receiving the location area update request message sent by the eNB, the access network control device configures a new location area identity list for the UE. Specifically, the access network control device may configure a location area identity list for the UE based on a location area identity that is of a current cell and that is reported by the UE. For detailed descriptions of the location area identity list, refer to the related descriptions in the embodiment shown in FIG. 2, and details are not described herein again.

S404: The access network control device sends a location area update request response message including an updated location area identity list to the eNB.

S405: The eNB sends the location area update request response message to the UE.

After receiving the location area update request response message sent by the access network control device, the eNB does not parse the response message, but forwards the location area update request response message to the UE.

It should be noted that the foregoing method may be implemented based on the method provided in the embodiment shown in FIG. 2. For example, steps S401 to S405 are performed after steps S201 to S203. This is not limited.

In the foregoing location area update process, the UE moves in a coverage area of the access network control device. The access network control device is responsible for updating the location area identity list for the UE in an idle state. The access network control device does not need to notify a core network device of movement of the UE. The core network device only needs to learn that the UE is in the coverage area of the access network control device. That is, a core network side and an access network side do not need to perform signaling interaction in the process. Optionally, the access network control device may send an indication message to the core network device, to notify the core network device that the UE is in the coverage area of the access network control device. The indication information includes identification information of the UE.

In another embodiment of the present application, a movement range of UE in an idle state expands. For example, the UE enters an NR cell, but the NR cell does not belong to a cell corresponding to a location area identity list previously obtained by the UE and the NR cell is in a coverage cell of another access network control device, when the UE initiates a location area update process, a signaling flow is shown in FIG. 5 and includes steps S501 to S508.

S501: The UE sends a location area update request message to an NR station.

Specifically, the UE sends the location area update request message to the NR station to which the NR cell belongs.

S502: The NR station sends the location area update request message to the access network control device.

S501 and S502 are the same as a location area update process triggered by movement of the access network control device, and details are not described herein again.

It should be noted that in this embodiment, the access network control device receiving the location area update request message of the UE is an access network control device managing the NR station to which the NR cell in which the UE is currently located belongs. That is, the UE is currently located in a coverage area of the access network control device.

S503: The access network control device sends an update indication message to a core network device.

The UE in an idle state moves out from a coverage area of another access network control device, and enters the coverage area of the access network control device for the first time. Therefore, after receiving the location area update request message sent by the UE, the access network control device needs to send an update indication to the core network device, to instruct the core network device to update an access network control device associated with the UE. The update indication includes at least identification information of the UE.

S504: The core network device updates an access network control device associated with the UE.

Specifically, the core network device may maintain an identification mapping list. The identification mapping list indicates a mapping relationship between the identification information of the UE and identification information of a radio access network server. The core network device updates, based on the identification information of the UE, the identification information of the radio access network server that is mapped to the identification information of the UE and that is in the identification mapping list to the identification information of the RAN server.

The access network control device performs mobility management on the UE, and only when the UE crosses the access network control device and moves, notifies the core network device to update an association relationship, reducing signaling interaction between an access network side and a core network side and reducing interface signaling load, thereby increasing a signaling response speed and improving system performance.

S505: The core network device replies to the access network control device with an update acknowledgement message.

S505 is an optional step.

S506: The access network control device updates the location area identity list of the UE.

S507: The access network control device sends a location area update request response message including an updated location area identity list to an eNB.

S508: The eNB sends the location area update request response message to the UE.

Steps S506 to S508 are similar to S403 to S405. Refer to the related descriptions in other embodiments of the present application including the embodiment shown in FIG. 4. Details are not described herein again.

In this embodiment, the UE in an idle state moves into a new cell. The cell is not within a range of a location area identity list previously configured by the UE, and the cell is not in an access network control device configuring the location area identity list for the UE. In this case, in a location area update process initiated by the UE, the access network control device needs to initiate an update process to the core network device. The core network device updates an access network control device corresponding to the UE. The access network control device is responsible for configuring a new location area identity list for the UE.

Optionally, in another embodiment of the present application, the method further includes:

Step S509: The core network device sends a release instruction to a source access network control device, to instruct the source access network control device to release a context of the UE.

The source access network control device is an associated access network control device before the UE enters the coverage area of the access network control device. To be specific, before the UE moves, the UE is located in a coverage area of the source access network control device, and obtains a communication service provided by the source access network control device. Moreover, before the foregoing location area update process is completed, in the identification mapping list of the core network device, there is a mapping relationship between the UE and the source server.

Optionally, in another embodiment of the present application, the access network control device may send the release instruction to the source access network control device. To be specific, the access network control device of the cell on which the UE currently camps instructs the source access network control device to release the context of the UE.

The context of the UE on the source access network control device is released, so that a resource of the source access network control device may be released. In addition, when the UE subsequently moves to a cell of the source access network control device again, the source access network control device considers that the UE enters the cell for the first time, and needs to notify the core network device. The core network device updates the access network control device associated with the UE to the source access network control device.

Figure 6:
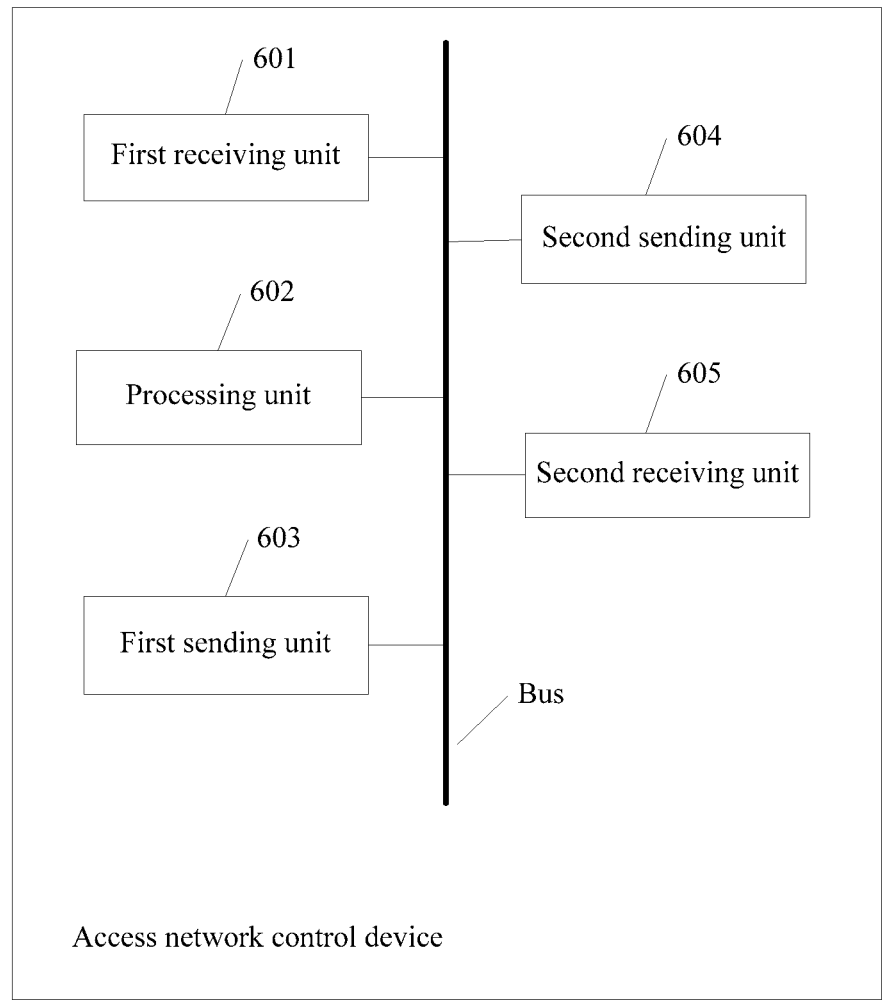
FIG. 6 is a schematic structural diagram of an access network control device according to an embodiment of the present application.

FIG. 6 is a schematic structural diagram of an access network control device according to an embodiment of the present application. The access network control device may be adapted to perform steps of the access network control device in the embodiments shown in FIG. 2 to FIG. 5.

Specifically, the access network control device includes the following units.

A first receiving unit 601 is adapted to receive a location area request message of user equipment UE through a first station, where the UE is located in a cell managed by the first station.

Specifically, the first receiving unit 601 may receive the location area request message of the UE forwarded by the first station.

A processing unit 602 is adapted to configure at least one location area identity list for the UE based on the location area request message, where the location area identity list includes at least one location area identity, and the location area identity is used to identify a location area.

The location area includes at least one cell. The access network control device provides an upper-layer protocol service to a station of the at least one cell. Refer to the related descriptions in the embodiment shown in FIG. 2.

Optionally, in an embodiment of the present application, the location area includes at least two cells, and the two cells use different RATs.

In this embodiment, the cells using the different RATs, namely, cells of different standards, are represented by using location area identities in a same location area identity list. For specific descriptions, refer to the related descriptions of embodiments of the method of the present application, and details are not described herein again.

Optionally, in an embodiment of the present application, the processing unit 602 is specifically adapted to configure a first location area identity list and a second location area identity list for the UE based on the location area request message.

In this embodiment, one location area identity list corresponds to one standard of cell. A quantity of location area identity lists is the same as a quantity of RATs corresponding to the access network control device. For specific descriptions, refer to the related content of embodiments of the method of the present application, and details are not described herein again.

A first sending unit 603 is adapted to send the at least one location area identity list to the UE through the first station.

Specifically, the first sending unit 603 sends, to the first station, the location area identity list configured for the UE, and the first station forwards the location area identity list to the UE.

According to the device disclosed in this embodiment of the present application, the access network control device performs mobility management on the UE, reducing signaling interaction between an access network side and a core network side and reducing interface signaling load, thereby increasing a signaling response speed and improving system performance.

Optionally, in an embodiment of the present application, the location area request message is an attach request message. After entering a coverage area of the access network control device, the UE initiates an attach process, to complete registration.

In this embodiment, the device further includes a second sending unit 604, adapted to send a registration request message to a core network device based on the attach request message received by the first receiving unit.

The access network control device further includes a second receiving unit 605, adapted to receive a registration request response message sent by the core network device.

The processing unit 602 is specifically adapted to: after the second receiving unit receives the registration request response message sent by the core network device, configure the at least one location area identity list for the UE.

The first sending unit 603 is specifically adapted to send, through the first station, an attach request response message including the at least one location area identity list to the UE.

For detailed descriptions of the attach process and detailed explanations of functions of the foregoing units in the attach process, refer to the descriptions of the related steps of embodiments of the method of the present application, for example, the embodiment shown in FIG. 3, and details are not described herein again.

Optionally, after the UE completes the attach process, if a downlink service of the UE needs to be sent, the network side may initiate a paging process. Correspondingly, the second receiving unit 605 is further adapted to receive a first paging message sent by the core network device. The first paging message is used to instruct the access network server to perform paging on the UE.

The first sending unit 603 is further adapted to send a second paging message to a station corresponding to the location area identity list configured for the UE, where the second paging message is used to instruct the station to perform paging on the UE.

The access network control device determined by a core network searches for a corresponding station based on the location area identity list, to perform paging. The core network device does not need to page each station, reducing signaling load on the core network side in the paging process.

Optionally, in another embodiment of the present application, the first receiving unit 601 is further adapted to receive a location area update request message. The location area update request message is used by the UE to request to update the location area. When the UE leaves a cell corresponding to an originally configured location area identity list during movement of the UE, the UE initiates a location area update request process, and obtains a location area identity list corresponding to a cell on which the UE currently camps.

In this embodiment, the processing unit 602 is further adapted to update the location area identity list of the UE based on the location area update request message.

The first sending unit 603 is specifically adapted to send, through the first station, a location area update request response message including an updated location area identity list to the UE.

Optionally, in another embodiment of the present application, when the UE leaves a coverage area of a source access network control device, and moves into the coverage area of the access network control device, the access network control device needs to initiate an update process to the core network, to instruct the core network to update an access network control device associated with the UE.

In this embodiment, the access network control device further includes the second sending unit 604, adapted to: before the processing unit 602 updates the location area identity list of the UE based on the location area update request message, send an update indication to the core network device, where the update indication is used to instruct the core network device to update the access network control device associated with the UE to the access network control device.

Optionally, the update indication includes identification information of the UE.

As shown in FIG. 6, the first receiving unit 601, the processing unit 602, the first sending unit 603, the second sending unit 604, and the second receiving unit 605 may be connected by using a bus, and the bus is not shown in FIG. 6. The foregoing units may alternatively be connected in another manner to implement direction communication or indirect communication. This is not particularly limited herein.

In another embodiment of the present application, for hardware implementation, functions of the receiving units 601 and 605 may be performed by a receiver, and functions of the sending units 603 and 604 may be performed by a transmitter. Alternatively, functions of the foregoing receiving units and sending units may be implemented by a transceiver or a communications module. The processing unit 602 may be embedded in or independent of a processor of a base station in a hardware form, or may be stored in a memory of a base station in a software form, so that the processor invokes and performs operations corresponding to the foregoing modules.

For detailed descriptions of the location area update process and detailed explanations of functions of the foregoing units in the location area update process, refer to the descriptions of the related steps of embodiments of the method of the present application, for example, the embodiments shown in FIG. 4 and FIG. 5, and details are not described herein again.

Figure 7:
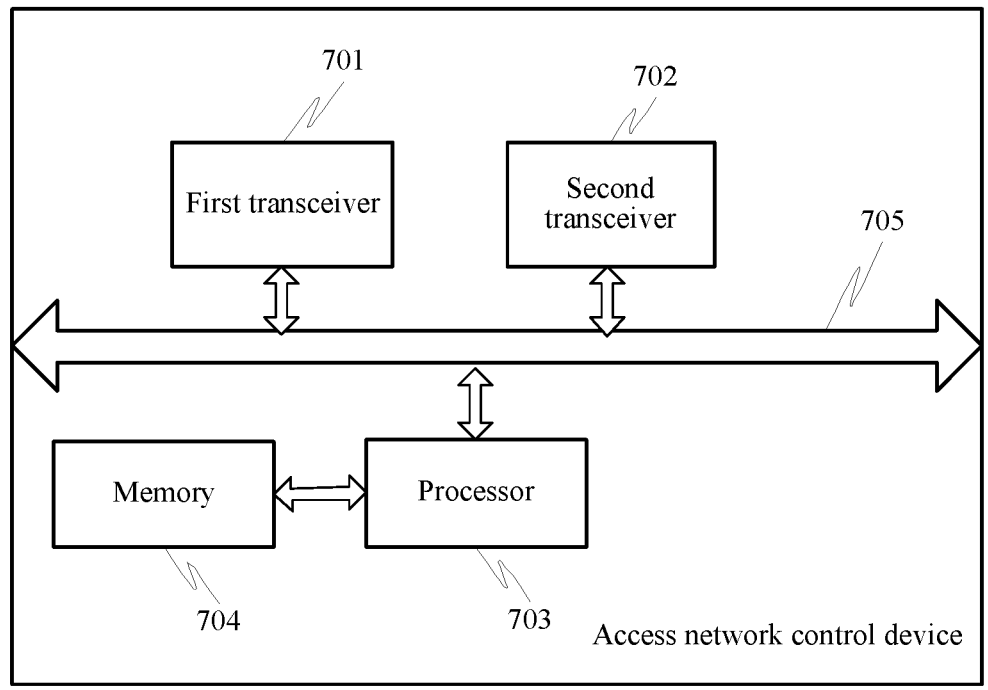
FIG. 7 is a schematic structural diagram of another access network control device according to an embodiment of the present application.

FIG. 7 is a possible schematic structural diagram of an access network control device according to an embodiment of the present application.

As shown in FIG. 7, the access network control device may include a first transceiver 701, a second transceiver 702 and a processor 703. The figure further shows a memory 704 and a bus 705. The first transceiver 701, the second transceiver 702, the processor 703, and the memory 704 are connected by using the bus 705 and communicate with each other through the bus 705.

The first transceiver 701 may be a communications interface. The communications interface may be directly or indirectly connected to a corresponding communications interface of a station managed by the access network control device, and is used for information exchange between the access network control device and the station.

The second transceiver 702 may be a communications interface. The communications interface may be directly or indirectly connected to a corresponding communications interface of a core network device, and is used for information exchange between the access network control device and a core network.

The processor 703 may be adapted to perform a processing process of the access network control device described in the method embodiments shown in FIG. 2 to FIG. 5 and/or be adapted to perform another process of the technology described in this application.

The memory 704 is adapted to store executable program code or data. The program code includes a computer operation instruction. The program code stored in the memory 704 may be executed by the processor 703.

For descriptions of the method process performed by the access network control device in this embodiment and a specific function of each apparatus or component in the device, refer to the related content in the other embodiments of the present application, and details are not described herein again.

It may be understood that FIG. 7 shows only a simplified design of the access network control device. During actual application, the access network control device may include any quantities of transceivers, processors, controllers, memories, communications units, and the like.

The access network control device in this embodiment of the present application may also be referred to as a CU or RAN server. All devices capable of implementing functions of the access network control device in this embodiment of the present application fall within the protection scope of the present application.

Figure 8:
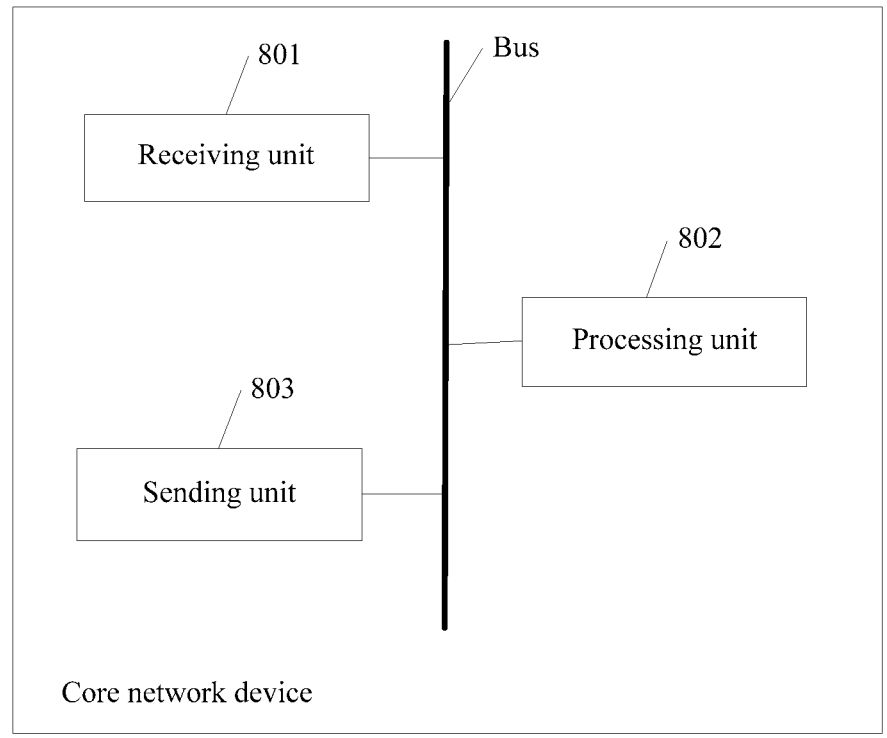
FIG. 8 is a schematic structural diagram of a core network device according to an embodiment of the present application.

FIG. 8 is a schematic structural diagram of a core network device according to an embodiment of the present application. The core network device may be adapted to perform a processing process of the core network device described in the method embodiments shown in FIG. 2 to FIG. 5 and/or be adapted to perform another process of the technology described in this application.

The core network device includes a receiving unit 801, adapted to receive an update indication sent by an access network control device, where the update indication includes identification information of UE, and the UE is located in a cell managed by the access network control device.

The core network device includes a processing unit 802, adapted to update, based on the identification information of the UE, an access network control device associated with the UE to the access network control device.

Specifically, when the UE enters a coverage area of a target access network control device from a coverage area of a source access network control device, and initiates a location area update process, the target access network control device sends an update message to a connected core network device, to request the core network device to update an access network device associated with the UE from a source access network device to a target access network device.

According to the device disclosed in this embodiment of the present application, the access network control device performs mobility management on the UE, and only when the UE crosses the access network control device and moves, notifies the core network device to update an association relationship, reducing signaling interaction between an access network side and a core network side and reducing interface signaling load, thereby increasing a signaling response speed and improving system performance.

Optionally, the processing unit 802 is further adapted to maintain an identification mapping list. The identification mapping list indicates a mapping relationship between the identification information of the UE and identification information of the access network control device. The processing unit 802 may update, based on the identification information of the UE, the identification information of the access network control device that is mapped to the identification information of the UE and that is in the identification mapping list to the identification information of the access network control device.

For specific content that the core network device updates the access network control device associated with the UE, refer to the related descriptions in embodiments of the method of the present application, and details are not described herein again.

Optionally, the core network device further includes a sending unit 803, adapted to send a release request to the source access network control device. The release request is used to instruct the source access network control device to release a context of the UE. The source radio access network service is an access network control device associated with the UE before the updating.

For specific content that the core network device instructs the source access network device to release the context of the UE, refer to the related descriptions in embodiments of the method of the present application, and details are not described herein again.

Figure 9:
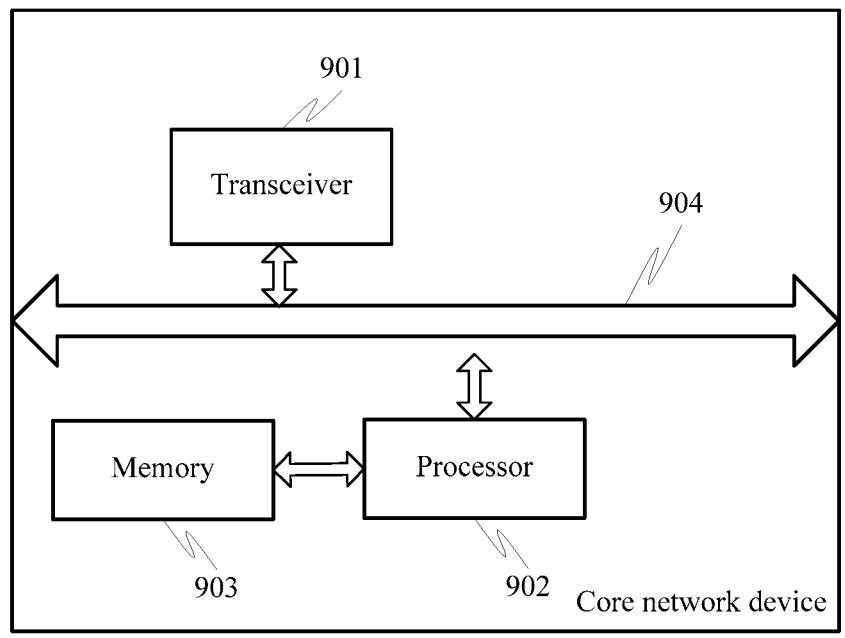
FIG. 9 is a schematic structural diagram of another core network device according to an embodiment of the present application.

FIG. 9 is a possible schematic structural diagram of a core network device according to an embodiment of the present application.

As shown in FIG. 9, the core network device may include a transceiver 901 and a processor 902. The figure further shows a memory 903 and a bus 904. The transceiver 901, the processor 902, and the memory 903 are connected by using the bus 904 and communicate with each other through the bus 904.

The transceiver 901 may be a communications interface. The communications interface may be directly or indirectly connected to a corresponding communications interface of an access network device, and is used for information exchange between an access network and a core network.

The processor 902 may be adapted to perform a processing process of the core network device described in the method embodiments shown in FIG. 2 to FIG. 5 and/or be adapted to perform another process of the technology described in this application.

The memory 903 is adapted to store executable program code or data. The program code includes a computer operation instruction. The program code stored in the memory 903 may be executed by the processor 902.

For descriptions of the method process performed by the core network device in this embodiment and a specific function of each apparatus or component in the device, refer to the related content in the other embodiments of the present application, and details are not described herein again.

Figure 10:
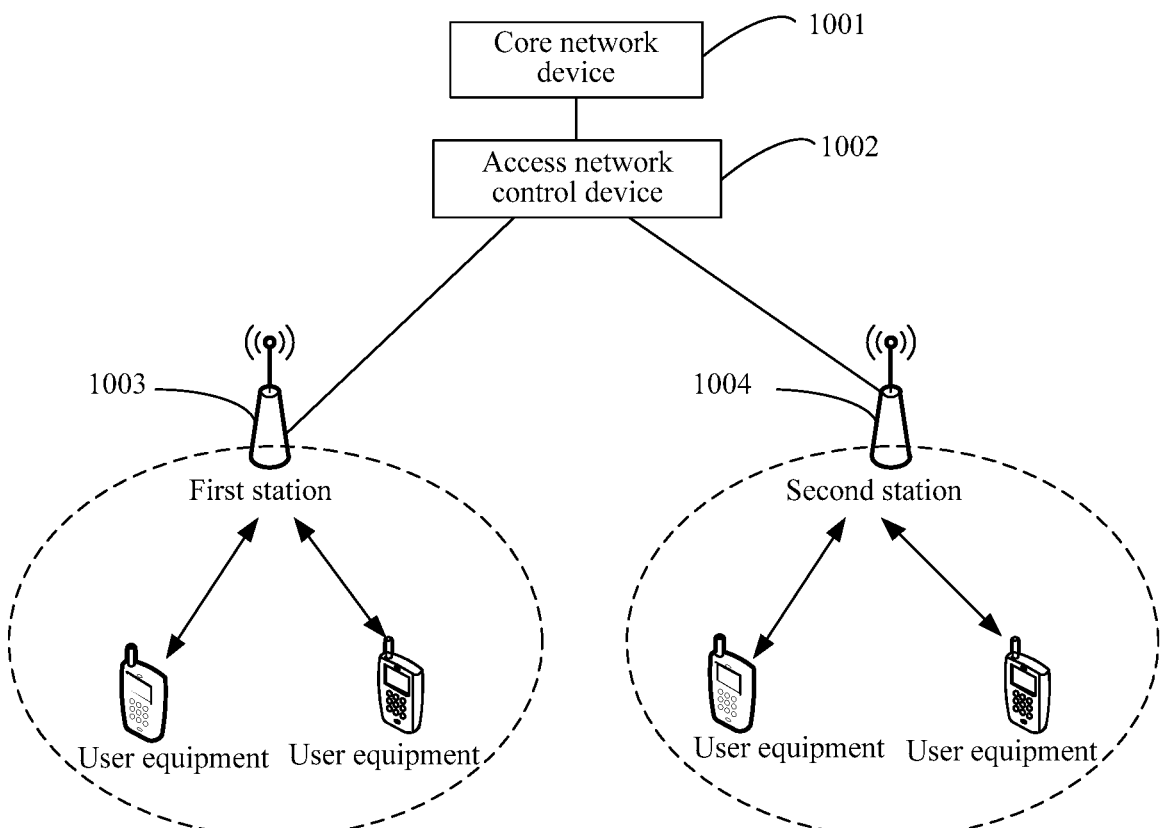
FIG. 10 is a schematic structural diagram of a communications system according to an embodiment of the present application.

A specific type of the core network device is not particularly limited in this embodiment of the present application. The core network device may be a device similar to an MME, an SGW, a PGW, or the like, or any combination of a plurality of core network devices.

application FIG. 10 is a schematic diagram of a communications system according to an embodiment of the present application.

The communications system includes a core network device 1001, an access network control device 1002, a first station 1003, and a second station 1004. The access network control device 1002 is connected to the core network device 1001. The first station 1003 and the second station 1004 are respectively connected to the access network control device 1002. A connection method between the devices is not particularly limited in this embodiment of the present application. The first station 1003 and the second station 1004 respectively use different RATs, that is, are different standards of stations. It may be understood that, a type and a quantity of stations managed by the access network control device are not limited in this embodiment of the present application, and FIG. 10 shows only an example.

The access network control device 1002 may be the access network control device in the embodiment shown in FIG. 6 or FIG. 7, and may perform the steps performed by the access network control device in the method embodiments shown in FIG. 2 and FIG. 3.

The core network device 1001 may be the core network device in the embodiment shown in FIG. 8 or FIG. 9, and may perform the steps performed by the core network device in the method embodiments shown in FIG. 2 and FIG. 3.

application It may be understood that a processor adapted to perform functions of the foregoing access network control device or core network device may be a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various examples of logical blocks, modules, and circuits that are described with reference to the content disclosed in the present application. The processor may also be a combination of processors implementing computing functions, for example, a combination of one or more microprocessors or a combination of a DSP and a microprocessor.

The bus in the embodiments of the present application may be an industry standard architecture (ISA) bus, a peripheral component interconnect (PCI) bus, an extended industry standard architecture (EISA) bus, or the like. The bus may be categorized as an address bus, a data bus, a control bus, and the like. For ease of indication, the bus is indicated by using only one bold line in FIG. 7 and FIG. 9. However, it does not indicate that there is only one bus or only one type of bus.

It may be clearly understood by a person skilled in the art that, for the purpose of convenient and brief description, a working process of the foregoing device and module is briefly described. For specific content, refer to the descriptions of a corresponding process in the foregoing method embodiments.

In the several embodiments provided in this application, it should be understood that the disclosed device and method may be implemented in another manner. For example, the described apparatus embodiments are merely examples. For example, the unit division is merely logical function division and may be other division during actual implementation. For example, a plurality of units or components may be combined or integrated into another device, or some features may be ignored or not performed. In addition, the functional units in the embodiments of the present application may be integrated into one processing unit, or each of the units may exist alone physically, or two or more units are integrated into one unit.

The methods or algorithm steps described with reference to the content disclosed in the present application may be implemented in a hardware manner, or may be implemented in a manner of executing a software instruction by a processor. The software instruction may include a corresponding software module. The software module may be stored in a RAM, a flash memory, a ROM, an EPROM, an EEPROM, a register, a hard disk, a removable hard disk, a CD-ROM, or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in user equipment. Certainly, the processor and the storage medium may exist in the user equipment as discrete components.

A person of skill in the art should be aware that in one or more of the foregoing examples, the functions described in the present application may be implemented by using hardware, software, firmware, or any combination thereof. When this application is implemented by using software, these functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general or dedicated computer.

The objectives, technical solutions, and benefit effects of the present application are further described in detail in the foregoing specific implementations. It should be understood that the foregoing descriptions are merely specific implementations of the present application, but are not intended to limit the protection scope of the present application. Any modification, equivalent replacement, or improvement made based on the technical solutions of the present application shall fall within the protection scope of the present application.

What is claimed is:

1. A mobility management method, comprising:
   receiving, by an access network control device, a location area request message of user equipment (UE) through a first station, wherein the UE is located in a cell managed by the first station;
   configuring, by the access network control device, at least one location area identity list for the UE based on the location area request message, wherein the at least one location area identity list comprises at least one location area identity, and wherein the at least one location area identity is used to identify a location area where the UE in an idle state is located; and
   sending, by the access network control device, the at least one location area identity list to the UE through the first station.

2. The method according to claim 1, wherein the location area comprises at least two cells, and wherein the at least two cells use different radio access technologies (RATs).

3. The method according to claim 1, wherein the configuring, by the access network control device, at least one location area identity list for the UE based on the location area request message comprises:
   configuring, by the access network control device, a first location area identity list and a second location area identity list for the UE based on the location area request message, wherein all cells comprised in a location area identified by any location area identity in the first location area identity list use a first RAT, wherein all cells comprised in a location area identified by any location area identity in the second location area identity list use a second RAT, and wherein the first RAT is different from the second RAT.

4. The method according to claim 1, wherein the location area request message is an attach request message;
   wherein the configuring, by the access network control device, a location area identity list for the UE based on the location area request message comprises:
      sending, by the access network control device, a registration request message to a core network device based on the attach request message; and
      configuring, by the access network control device, the at least one location area identity list for the UE after receiving a registration request response message from the core network device; and
   wherein the sending, by the access network control device, the at least one location area identity list to the UE through the first station comprises:
      sending, by the access network control device, an attach request response message comprising the at least one location area identity list to the UE through the first station.

5. The method according to claim 1, further comprising:
   receiving, by the access network control device, a location area update request message from the first station, wherein the location area update request message is used by the UE to request to update the location area;
   updating, by the access network control device, the location area identity list of the UE based on the location area update request message; and
   sending, by the access network control device through the first station, a location area update request response message to the UE, wherein the location area update request response message comprises an updated location area identity list.

6. The method according to claim 5, further comprising:
sending, by the access network control device, an update indication to a core network device, wherein the update indication is used to instruct the core network device to associate the access network control device with the UE.

7. The method according to claim 6, wherein the update indication comprises identification information of the UE.

8. The method according to claim 1, further comprising:
receiving, by the access network control device, a first paging message from a core network device, wherein the first paging message is used to instruct the access network control device to perform paging on the UE; and
sending, by the access network control device, a second paging message to a station corresponding to the location area identity list configured for the UE, wherein the second paging message is used to instruct the station to perform paging on the UE.

9. An access network control device, comprising:
a first receiver, the first receiver adapted to receive a location area request message of user equipment (UE) through a first station, wherein the UE is located in a cell managed by the first station;
at least one processor, the at least one processor adapted to configure at least one location area identity list for the UE based on the location area request message, wherein the location area identity list comprises at least one location area identity, and wherein the location area identity is used to identify a location area where the UE in an idle state is located; and
a first transmitter, the first transmitter adapted to send the at least one location area identity list to the UE through the first station.

10. The access network control device according to claim 9, wherein the location area comprises at least two cells, and wherein the at least two cells use different radio access technologies (RATs).

11. The access network control device according to claim 9, wherein the at least one processor is adapted to configure a first location area identity list and a second location area identity list for the UE based on the location area request message, wherein all cells comprised in a location area identified by any location area identity in the first location area identity list use a first RAT, wherein all cells comprised in a location area identified by any location area identity in the second location area identity list use a second RAT, and wherein the first RAT is different from the second RAT.

12. The access network control device according to claim 9, wherein the location area request message received by the first receiver is an attach request message;
wherein the access network control device further comprises a second transmitter, the second transmitter adapted to send a registration request message to a core network device based on the attach request message received by the first receiver;
wherein the access network control device further comprises a second receiver, the second receiver adapted to receive a registration request response message sent by the core network device;
wherein the at least one processor is adapted to configure the at least one location area identity list for the UE; and
wherein the first transmitter is adapted to send an attach request response message comprising the at least one location area identity list to the UE through the first station.

13. The access network control device according to claim 9, wherein the first receiver is further adapted to receive a location area update request message from the first station, wherein the location area update request message is used by the UE to request to update the location area;
wherein the at least one processor is further adapted to update the location area identity list of the UE based on the location area update request message; and
wherein the first transmitter is adapted to send, through the first station, a location area update request response message comprising an updated location area identity list to the UE.

14. The access network control device according to claim 13, further comprising a second transmitter, the second transmitter adapted to send an update indication to a core network device, wherein the update indication is used to instruct the core network device to associate the access network control device with the UE.

15. The access network control device according to claim 14, wherein the update indication comprises identification information of the UE.

16. The access network control device according to claim 9, further comprising:
a second receiver, the second receiver adapted to receive a first paging message from a core network device, wherein the first paging message is used to instruct the access network control device to perform paging on the UE; and
wherein the first transmitter is further adapted to send a second paging message to a station corresponding to the location area identity list configured for the UE, wherein the second paging message is used to instruct the station to perform paging on the UE.

17. A core network device, comprising:
a receiver, the receiver adapted to receive an update indication from an access network control device, wherein the update indication comprises identification information of user equipment (UE), and wherein the UE in an idle state is located in a cell managed by the access network control device; and
at least one processor, the at least one processor adapted to:
associate, based on the identification information of the UE, the UE with the access network control device;
maintain an identification mapping list, wherein the identification mapping list indicates a mapping relationship between the identification information of the UE and identification information of the access network control device; and
update, based on the identification information of the UE, identification information of an access network control device that is mapped to the identification information of the UE and that is in the identification mapping list to the identification information of the access network control device.

18. The core network device according to claim 17, further comprising a transmitter, wherein the transmitter is adapted to send a release request to a source access network control device, wherein the release request is used to instruct the source access network control device to release a context of the UE, and wherein the source access network control device is an access network control device associated with the UE before the updating.

* * * * *